US012609415B2

(12) United States Patent
Prabhanjan et al.

(10) Patent No.: US 12,609,415 B2
(45) Date of Patent: Apr. 21, 2026

(54) INTERCONNECTING STRUCTURE FOR ENERGY STORAGE CELLS

(71) Applicant: TVS MOTOR COMPANY LIMITED, Chennai (IN)

(72) Inventors: Kumar Prabhanjan, Chennai (IN); Subbiah Senthilnathan, Chennai (IN); Jabez Dhinagar Samraj, Chennai (IN)

(73) Assignee: TVS MOTOR COMPANY LIMITED, Chennai (IN)

( * ) Notice: Subject to any disclaimer, the term of this patent is extended or adjusted under 35 U.S.C. 154(b) by 739 days.

(21) Appl. No.: 17/919,089

(22) PCT Filed: Apr. 15, 2021

(86) PCT No.: PCT/IN2021/050377
§ 371 (c)(1),
(2) Date: Oct. 14, 2022

(87) PCT Pub. No.: WO2021/210021
PCT Pub. Date: Oct. 21, 2021

(65) Prior Publication Data
US 2023/0163422 A1 May 25, 2023

(30) Foreign Application Priority Data
Apr. 16, 2020 (IN) ............................. 202041016391

(51) Int. Cl.
*H01M 10/48* (2006.01)
*H01M 10/42* (2006.01)
(Continued)

(52) U.S. Cl.
CPC ....... *H01M 50/503* (2021.01); *H01M 10/482* (2013.01); *H01M 50/213* (2021.01); *H01M 50/522* (2021.01); *H01M 2010/4271* (2013.01)

(58) Field of Classification Search
CPC ............. H01M 50/503; H01M 10/482; H01M 50/213; H01M 50/522; H01M 2010/4271;
(Continued)

(56) References Cited

U.S. PATENT DOCUMENTS

2005/0079408 A1* 4/2005 Hirano ................ H01M 10/613
429/174
2010/0105258 A1* 4/2010 Koetting ............. H01M 50/503
439/883
(Continued)

FOREIGN PATENT DOCUMENTS

CN 103840221 A 6/2014
EP 3131161 A1 2/2017
(Continued)

OTHER PUBLICATIONS

International Search Report issued in corresponding International Application No. PCT/IN2021/050377 mailed Aug. 3, 2021 (3 pages).
(Continued)

*Primary Examiner* — Christian Roldan
(74) *Attorney, Agent, or Firm* — Osha Bergman Watanabe & Burton LLP

(57) ABSTRACT

An energy storage device includes: a cell holder assembly; energy storage cells disposed in the cell holder assembly; and interconnect members that connect with the energy storage cells. The interconnect members include: double row interconnecting structures disposed on opposite sides of the cell holder assembly; and a pair of single row terminal interconnecting structures that border the double row interconnecting structures on both sides. Each of the interconnect members includes a first independent metallic layer member and a second independent metallic layer member that are electrically coupled to each other and that electrically connect to the energy storage cells. The first independent
(Continued)

metallic layer member is an upper member of each interconnect member that connects the interconnect member with a battery management system (BMS). The second independent metallic layer member is a lower member of each interconnect member that connects the interconnect member with the energy storage cells.

7 Claims, 7 Drawing Sheets

(51) Int. Cl.
H01M 50/213 (2021.01)
H01M 50/503 (2021.01)
H01M 50/522 (2021.01)

(58) Field of Classification Search
CPC ........... H01M 50/204; H01M 2220/20; H01M 50/519; H01M 50/526; H01M 50/507; H01M 10/42; H01M 10/44; H01M 10/48; Y02E 60/10

USPC ........................................................ 429/159
See application file for complete search history.

(56) References Cited

U.S. PATENT DOCUMENTS

2015/0050532 A1\* 2/2015 Waigel .............. H01M 10/6561
429/61
2018/0190960 A1\* 7/2018 Harris ................... H01M 50/20

FOREIGN PATENT DOCUMENTS

EP          3633762 A1     4/2020
WO      20130131588 A2     9/2013

OTHER PUBLICATIONS

Written Opinion issued in corresponding International Application No. PCT/IN2021/050377 mailed Aug. 3, 2021 (5 pages).

\* cited by examiner

103a

104

103a

104

INTERCONNECTING STRUCTURE FOR ENERGY STORAGE CELLS

TECHNICAL FIELD

The present invention relates to a vehicle. More particularly, the present invention relates to at least one interconnecting structure for energy storage cells of an energy storage device.

BACKGROUND

In recent times there is an increased demand to control emissions from automobiles, in view of stringent emission norms. As a result, a number of hybrid and electric vehicles are seeing the light of the day in order to minimize the amount of emissions. Typically, hybrid vehicles have distinct advantage of allowing longer travel, as at least one source is always available to drive the vehicle. Hence, there is low risk of running out of fuel or getting stranded as it may happen with a traditional internal combustion powered vehicle.

Hybrid vehicles which are configured to be powered either by an internal combustion engine or electric motor or both are off-late replacing normal engine powered vehicles. In the Hybrid vehicles, an internal combustion engine can be used for driving on terrain or for long distances and electric propulsion system can be used for the shorter distances. However, incorporation of both internal combustion engine and electric motor assembly in the hybrid vehicle and especially in a two-wheeled vehicle makes the system bulky and more complex.

Thus, electric vehicles have gained popularity in recent years as the potential replacement for internal combustion vehicles, since they promise zero emission from electric drive system, and a break away from oil dependency. Hence, a focus of the electric vehicle industry in battery research is directed to rechargeable batteries, such as sealed, starved electrolyte, lead/acid batteries, are commonly used as power sources in vehicles and the like. However, lead-acid batteries are heavy, bulky, and have short cycle life, short calendar life, and low turn around efficiency. Hence, a pure electric vehicle entails a problem in that its own weight increases. Also, the traveling distance for a pure electric vehicle is short, and due to packaging constraints it is difficult to mount one or more batteries as an additional rechargeable back-up power source. The limited spaces of the vehicle and further structural challenges for installing said one or more additional batteries thereon is another constraint with pure electric vehicles.

In order to overcome problems associated with said conventional energy storage devices including the lead-acid batteries for the vehicle, a lithium ion battery cell provides an ideal system for high energy-density applications, improved rate capability, and safety. Further, the rechargeable energy storage devices like lithium-ion batteries exhibit characteristics such as flexibility, solid components and more which makes it useable on the vehicle. First, for safety reasons, the lithium ion battery is constructed of all solid components while still being flexible and compact. Secondly, the energy storage device including the lithium ion battery exhibits similar conductivity characteristics to primary batteries with liquid electrolytes, i.e., deliver high power and energy density with low rates of self-discharge. Thirdly, the energy storage device as the lithium ion battery is readily manufacturable in a manner that it is both reliable and cost-efficient. Finally, the energy storage device including the lithium ion battery is able to maintain a necessary minimum level of conductivity at sub-ambient temperatures.

In a known structure for an energy storage device, the energy storage cells including lithium ion battery cells are disposed in at least one cell holder assembly in series and/or parallel combinations. Generally, the interconnect members are adapted for electrically interconnecting at least one array of the energy storage cells being disposed in said at least one energy storage device. Particularly, each of the interconnect members and at least one of the energy storage cells are made of dissimilar materials. Further, the interconnecting plates includes metal plate made up of steel and the energy storage cell terminals are made of nickel. However, Nickel is not as good as a conductor as steel. Hence in the known structure, the interconnecting plates including metal plates having high thermal and electrical conductivity are electrically connected to at least one terminal of each of the energy storage cells through a spot welding method having at least one contact point.

BRIEF DESCRIPTION OF THE DRAWINGS

The detailed description is described with reference to the accompanying figures. The same numbers are used throughout the drawings to reference like features and components.

DETAILED DESCRIPTION

Figure 1:
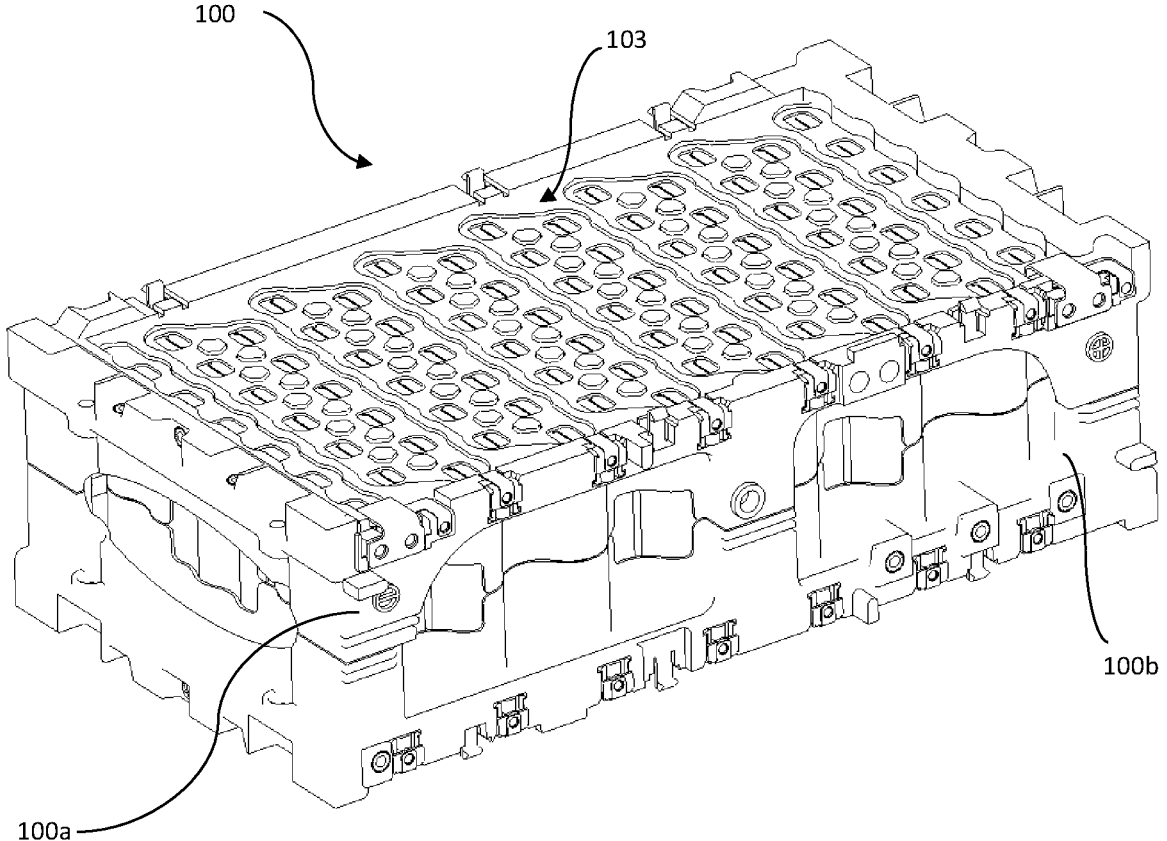
FIG. 1 is a perspective view of at least one energy storage device, as per one embodiment of the present invention.

In a typical design for one or more interconnect members, one or more slits are integrally formed in at least a portion thereof. The one or more slits comprises at least one electrode structure configured to form at least one contact joint with at least one terminal of each of said one or more energy storage cells through the spot welding. Particularly, each of said one or more slits formed in said at least a portion of said one or more interconnect members includes a shaped profile having a small cross section. The shunt current passing through said each of said one or more interconnect members takes extremely short travel path and a shorter time interval to travel through each of said one or more interconnect members. Thus, a larger current flows through said each of one or interconnecting plates develops very less resistance across said at least one electrode structure of said one or more interconnecting plates and said at least one terminal of the one or more energy storage cells. This is not sufficient enough to heat said at least one electrode structure to molten steel and forms a weak contact point between said interconnect members and said one or more energy storage cells.

In another known design configured with slits in the interconnecting structure, high current flows through the interconnect members. This occurs due to low resistance developed across an electrode & a terminal of the energy storage cell. As a consequence, not enough molten steel is available at the interface of the interconnecting structure & the energy storage cells leading to poor electrical contact.

In yet another known design the high shunt current across the contact point tends to reduce the diameter thereof, thereby rendering said one or more contact points more susceptible to damage, expulsions and degradation of said at least one electrode structure. This causes damage to the entire energy storage cells and thus resulting in high cost replacement for the entire at least one cell of the energy storage cells. Sensing the correct voltage across the cells is an important parameter and any error in this can lead to cell imbalance and battery malfunction. It was observed that high current withdrawing leads to error in voltage sensed and melting of the interface parts. Moreover, conventional art has limited power rating and is limited due to manufacturing constraints. Thus, there is a need for an improved solution of interconnector which can overcome all of the above problems & other problems in known art.

With the above objectives in view, the present invention provides an improved design for the one or more interconnecting structure configured for electrically interconnecting one or more energy storage cells being disposed in the one or more configuration in at least one energy storage device. In one embodiment, each of said one or more interconnect members comprises one or more apertures in the form of the slits integrally formed in at least a portion thereof. In one embodiment, said one or more apertures including slits are formed in the manner so as to be in alignment with at least one terminal of said one or more energy storage cells being disposed in said at least one cell holder assembly of said at least one energy storage device. In one embodiment, said slit is comprising one or more receiving portions integrally formed therein and adapted to receive said one or more energy storage devices. As per one embodiment, a plurality of interconnect members includes a pair of single row terminal interconnect members bordering a plurality of double row interconnecting structure wherein the double row interconnecting structure are disposed on opposite sides of the energy storage cell holder assembly. Further, each interconnect member of the plurality of interconnect members is constituted by two independent metallic layer members integrated to each other for electrically connecting the plurality of energy storage cells.

As per one embodiment, each of said plurality of interconnecting structure comprises of a first independent metallic layer member and a second independent metallic layer member. In one embodiment, said first independent metallic layer member constitutes an upper member of each interconnecting structure of the plurality of interconnect members. As per one embodiment, said second independent metallic layer member constitutes a lower member of each interconnecting structure of the plurality of interconnect members.

In one embodiment, said first independent metallic layer member is connected with said second independent metallic layer member via means of joining process such as RSW (Resistance Spot Welding), laser welding, bonding or ultrasonic welding. As per one of the embodiments, each single row terminal interconnecting structure of said pair of single row terminal interconnect members terminates with two independent arms including a first independent arm and a second independent arm. In one embodiment, said first independent arm extends from an upper member of each of said single row terminal interconnecting structure and is made of copper. As per one of the embodiments, said second independent arm extends from a lower member of each of said single row terminal interconnecting structure and is made of nickel. In one embodiment, said first independent arm comprises two openings for withdrawing current. As per one of the embodiments, said second independent arm comprises one opening for measuring voltage.

As per one of the embodiments, said first independent metallic layer has a plurality of apertures with reference to at least one of said plurality of energy storage device. In one embodiment, said first independent metallic layer is attached with an energy storage device (5− and 5+) to collect the current. As per one of the embodiments, an opening is provided to sense the voltage of corresponding rows of said energy storage device. As per one of the embodiments, said first independent metallic layer is made of metal such as nickel, copper, steel, clad or metal alloy. The collected current (I) from said energy storage device are merged in said second independent metallic layer. As per one of the embodiments, the collected current (I) from said energy storage device is withdrawn from a plurality of openings positioned at the end of said interconnect member. In one embodiment, said second independent metallic layer member can be separately utilized as a power line.

In one embodiment, said plurality of apertures is internally formed with said plurality of interconnect members. As per one of the embodiments, said second independent metallic layer has a plurality of openings to access said plurality of apertures positioned on said first independent metallic layer. In one embodiment, a plurality of energy storage device is attached to said interconnect member via said plurality of apertures.

As per one of the embodiments, said opening on second independent arm and said plurality of openings on first independent arm are attached with Battery Management System (BMS) power tab and voltage tab by connecting means such as screw. In one embodiment, said interconnect member is used at 5+ and 5− inside a battery module. As per one of the embodiments, said interconnect member is made of nickel, steel, copper, clad or metal alloy etc. In one embodiment, the combination of material used for manufacturing said first independent metallic layer and said second independent metallic layer is same. As per one of the embodiments, the combination of material used for manufacturing said first independent metallic layer and said second independent metallic layer is different. In one embodiment, the thickness of said first independent metallic layer is relatively lower than said second independent metallic layer. As per one of the embodiments, the thickness of said first independent metallic layer and said second independent metallic layer is different.

The object of the present invention is to provide an improved design for said one or more interconnect members adapted for interconnecting arrays of said one or more energy storage cells. More particularly, as per one embodiment, said one or more interconnect members are patterned with said one or more apertures formed in at least a portion therein. In one embodiment, each aperture of said one or more apertures forms electrical connections between said at least one electrode structure and said at least one terminal of said one or more energy storage devices. As per one embodiment, a plurality of interconnect members includes a pair of single row terminal interconnect members bordering a plurality of double row interconnecting structure on both sides, wherein the double row interconnecting structure are disposed on opposite sides of the energy storage cell holder assembly. Further, each interconnecting structure of the plurality of interconnect members being constituted by two independent metallic layers member electrically coupled to each other for electrically connecting the plurality of energy storage cells.

In one embodiment, said at least one energy storage device includes said one or more energy storage cells disposed in said at least one cell holder assembly of said energy storage device. As per one embodiment, said one or more energy storage cells disposed in said one or more configuration including parallel and/or series configuration are electrically connected through a plurality of interconnect members via said plurality of apertures.

Various other features and advantages of the invention are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number. With reference to the accompanying drawings, wherein the same reference numerals will be used to identify the same or similar elements throughout the several views. It should be noted that the drawings should be viewed in the direction of orientation of the reference numerals.

FIG. 1 is a perspective view of at least one energy storage device (100), as per one embodiment of the present invention. In one embodiment, said energy storage device (100) comprises at least one cell holder assembly (101) comprising of a securing cell holder (100a) and a receiving cell holder (100b). In one embodiment, said at least one energy storage device (100) further comprises one or more energy storage cells (not shown) being disposed in said at least one cell holder assembly (101). As per one embodiment, said one or more energy storage cells are electrically connected in at least one configuration including a series combination and/or parallel configuration to form said one or more array of combinations for said one or more energy storage cells. As per one embodiment, said each of said array of electrically connected storage cells are connected together through one or more interconnect members (103). As per one embodiment, a plurality of interconnect members (103) includes a pair of single row terminal interconnecting structure (103b) bordering a plurality of double row interconnecting structure (103a) on both sides, wherein the double row interconnecting structure (103a) are disposed on opposite sides of the energy storage cell holder assembly (101). Further each interconnecting structure (103a, 103b) of the plurality of interconnect members (103) being constituted by two independent metallic layers members electrically coupled to each other for electrically connecting the plurality of energy storage cells.

Figure 2:
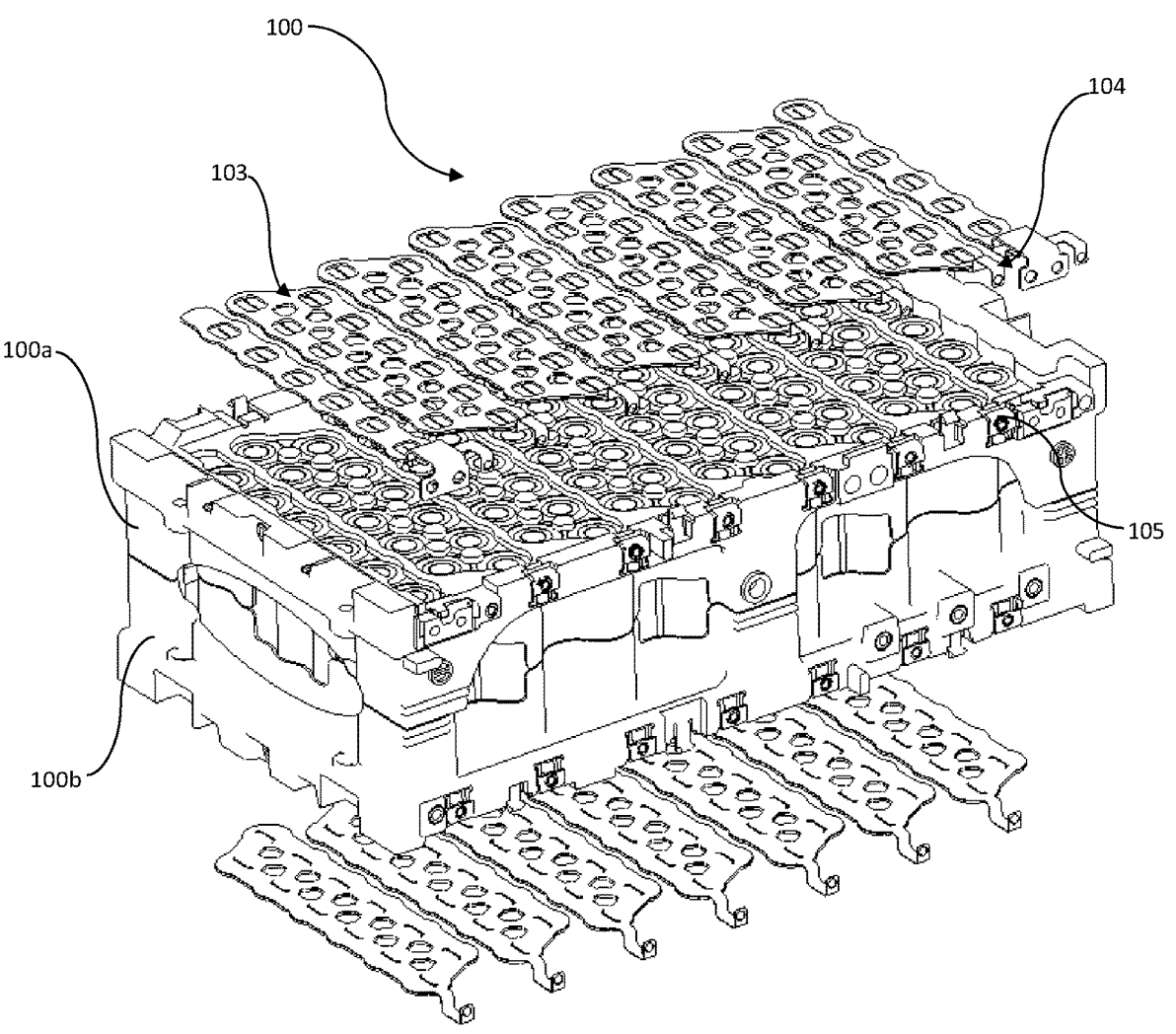
FIG. 2 is an exploded view of said at least one energy storage device, as per one embodiment of the present invention.

FIG. 2 is an exploded view of energy storage device (100), as per one embodiment of the present invention. In one embodiment said each of the array of said one or more energy storage cells are disposed in at least one cell holder assembly (101). In one embodiment, said plurality of interconnect members (103) are adapted for electrically interconnecting said one or more energy storage cells. In one embodiment, at least one end portion (104) (shown in FIG. 4) of each of said interconnect members (103) are electrically connected for transmitting current and voltage output of said at least one energy storage device (100) thereto. Particularly, as per one embodiment, said at least one cell holder assembly (101) includes one or more mounting provisions formed therein. In one embodiment, said plurality of interconnect members (103) is electrically connected to a battery management system through said one or more mounting provisions (105). In one embodiment, said battery management system is configured for monitoring the output current and voltage for said at least one energy storage device (100) for transmitting said output current and said output voltage to one or more electrical components.

Figure 3A:
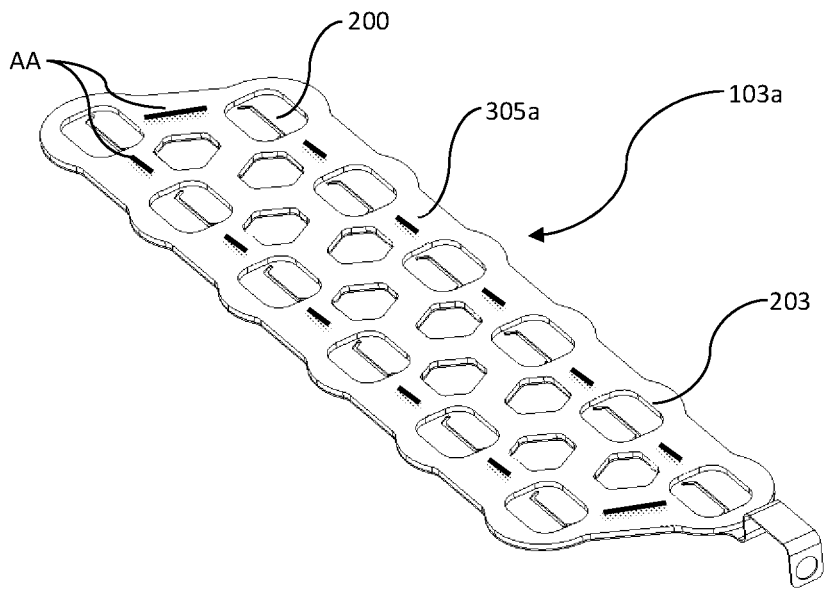
FIG. 3a is a perspective view of at least one interconnecting structure for said at least one energy storage device of FIG. 1, as per one embodiment of the present invention.
Figure 3B:
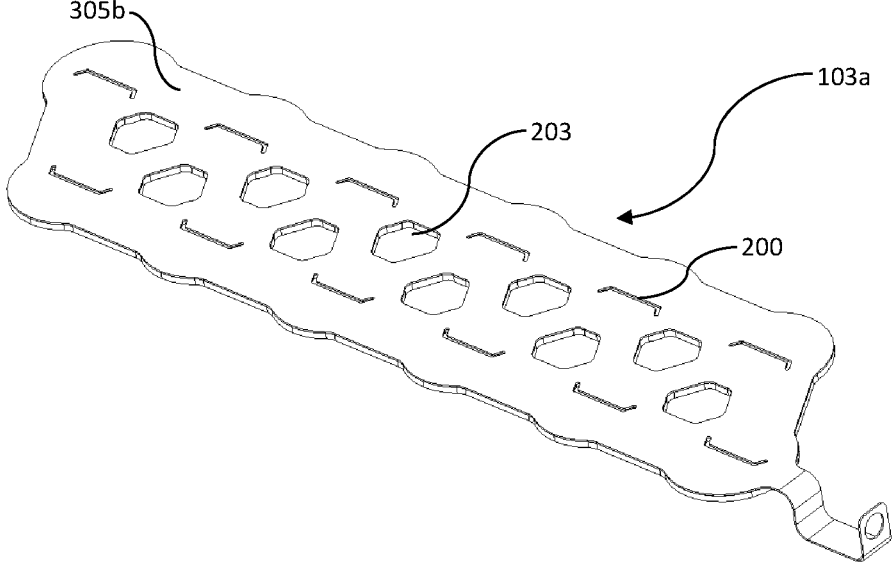
FIG. 3b is a perspective view of at least one interconnecting structure for said at least one energy storage device of FIG. 1, as per one embodiment of the present invention.

FIG. 3a & FIG. 3b is a perspective view of said at least one double row interconnecting structure (103a) of said one or more interconnect members (103) of said at least one energy storage device (100) of FIG. 1, as per one embodiment of the present invention. In one embodiment, said one or more energy storage cells disposed in said at least one cell holder assembly (101) of said at least one energy storage device (100) are interconnected by said plurality of interconnect members (103). In one embodiment, said at least one double row interconnecting structure (103a) of said plurality of interconnect members (103) (shown in FIG. 2) comprises said one or more openings (203) adapted for securely positioning said each of said one or more energy storage cells in said at least one cell holder assembly (101). In one embodiment, said at least a portion of said at least one cell holder assembly (101) includes one or more locking structure formed integrally with at least a portion thereof. The one-or more locking structure conforms to a predetermined profile of each of said one or more openings (203) to securely position said each of said one or more interconnecting plates to said at least one cell holder assembly to lock interconnector while joining to form electrically conductive joint.

As per one embodiment, a plurality of apertures (200) in the form of slits are formed in at least a portion of said each interconnecting structure (103a) of said plurality of interconnect members (103). In one embodiment, at least one electrode structure protrudes towards a bottom face of said double row interconnecting structure (103a) in a substantially perpendicular direction to a surface of said double row interconnecting structure (103a). As per one embodiment, each of said plurality of double row interconnecting structure (103a) includes a first independent metallic layer member (305a) and a second independent metallic layer member (305b) together forming said double row interconnecting structure (103a). As per an aspect of the present invention said first independent metallic layer member (305a) constitutes an upper member of each of said double row interconnecting structure (103a) of said plurality of interconnect members (103) and similarly second independent metallic layer member (305b) constitutes a lower member of each double row interconnecting structure (103a) of said plurality of interconnect members (103). Thus, the present subject matter prevents the power loss and minimizes the cell imbalance due to voltage fluctuation. As a result charging and discharging of cells is effectively handled.

In one embodiment, said first independent metallic layer member (305a) is connected with said second independent metallic layer member (305b) via means of joining process such as RSW (Resistance Spot Welding) AA, laser, bonding or ultrasonic welding. As per one of the embodiments, said first independent metallic layer member (305a) includes said plurality of apertures (200) with reference to at least one of said plurality of energy storage device. In one embodiment, said first independent metallic layer member (305a) is attached with an energy storage device (5– and 5+ volts) to collect the current.

Figure 4A:
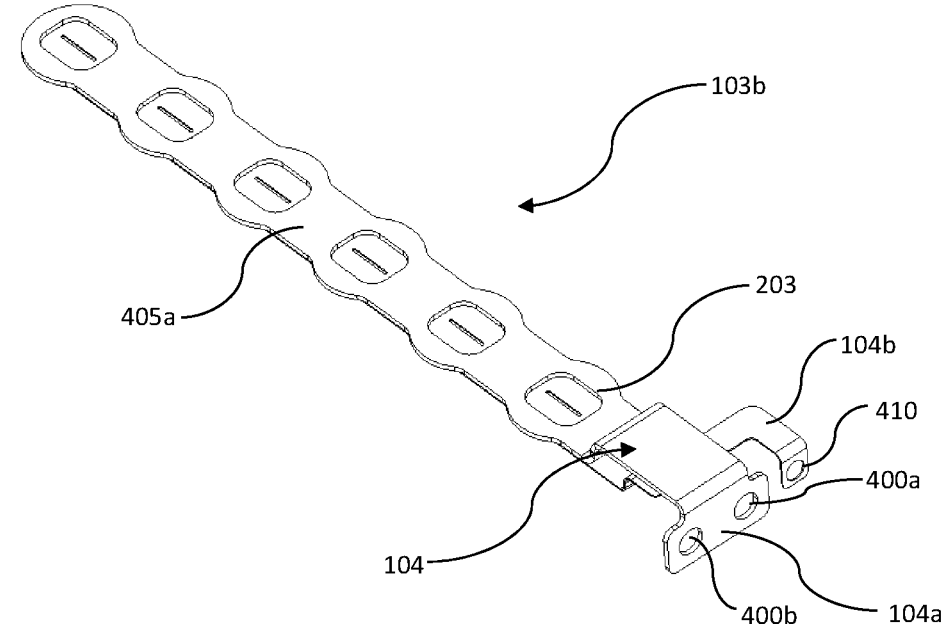
FIG. 4a is a perspective view of at least one single row interconnecting structure for said at least one energy storage device of FIG. 1, as per one embodiment of the present invention.
Figure 4B:
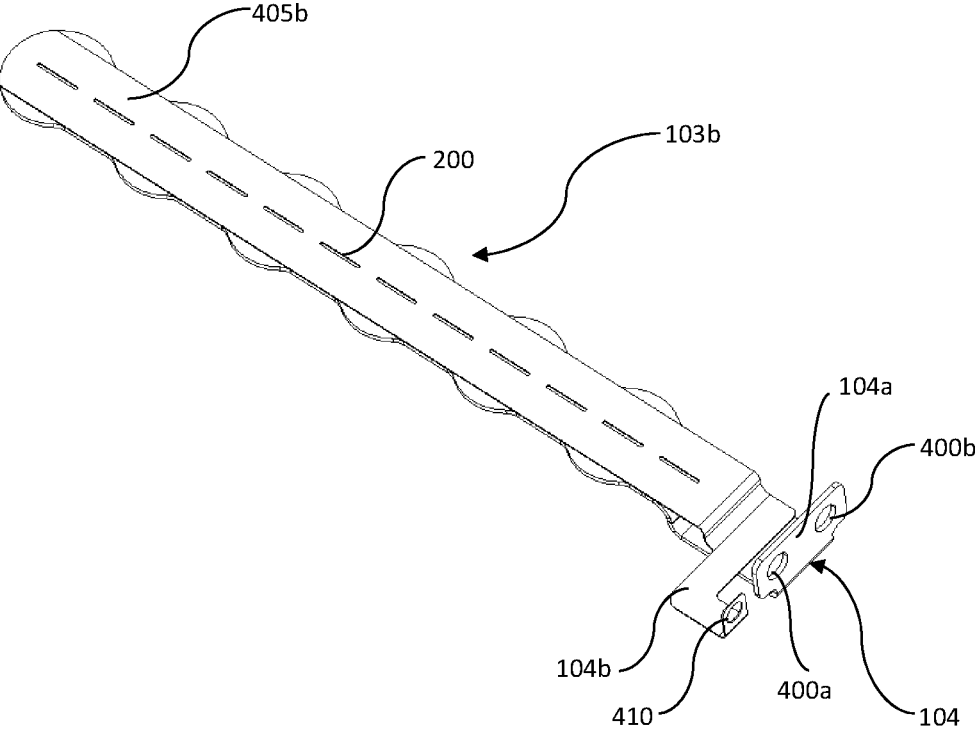
FIG. 4b is a perspective view of at least one single row interconnecting structure for said at least one energy storage device of FIG. 1, as per one embodiment of the present invention.

FIG. 4a and FIG. 4b is a perspective view of a single row set of interconnecting structure (103b) including said one or more apertures (200) formed in at least a portion therein, as per one embodiment of the present invention. In one embodiment, said at least one end portion (104) (shown in FIG. 4a) of said each of said set of interconnecting structure (103b) are electrically connected for transmitting current and voltage output of said at least one energy storage device (100) thereto through one or more mounting members including at least one attaching member e.g. a fastener. As per one embodiment, each single row of terminal interconnecting structure (103b) of said plurality of interconnect members (103) terminates with two independent arms (104a), (104b) including a first independent arm (104a) and a second independent arm (104b).

As per one embodiment, each of said single row of terminal interconnecting structure (103b) includes a first independent metallic layer member (405a) and a second independent metallic layer member (405b). In one embodiment, said first independent metallic layer member (405a) constitutes an upper member of each interconnecting structure (103b) of the plurality of interconnect members (103). As per one embodiment, said second independent metallic layer member (405b) constitutes a lower member of each interconnecting structure (103b) of the plurality of interconnect members (103). In one embodiment, said first independent metallic layer member (405a) is connected with said second independent metallic layer member (405b) via means of joining process such as RSW (Resistance Spot Welding) AA, laser, bonding or ultrasonic welding.

In one embodiment, said first independent arm (104a) extends from said first independent metallic layer member (405a) of each of said single row terminal interconnecting structure (103b) and is made of copper. As per one of the embodiments, said second independent arm (104b) extends from said second independent metallic layer member (405b) of said single row terminal interconnecting structure (103b) and is made of nickel. In one embodiment, said first independent arm (104a) comprises a plurality of openings (400a), (400b) for withdrawing current. As per one of the embodiments, said second independent arm (104b) comprises an opening (410) for measuring voltage.

As per one of the embodiments, said opening (410) on second independent arm (104b) is provided to sense the voltage of corresponding rows of said energy storage device. As per one of the embodiments, said first independent metallic layer member (405a) is made of metal such as nickel, copper, steel, clad or metal alloy. The collected current (I) from said energy storage device are merged in said second independent metallic layer member (405b). As per one of the embodiments, the collected current (I) from said energy storage device is withdrawn from said plurality of openings (400a), (400b) positioned on said first independent arm (104a). In one embodiment, said second independent metallic layer member (405b) separately acts as a power line.

In one embodiment, said plurality of apertures (200) is internally formed with said plurality of interconnect members (103). As per one of the embodiments, said second independent metallic layer member (405b) has said plurality of openings (203) to access said plurality of apertures (200) positioned on said first independent metallic layer member (405a). In one embodiment, a plurality of energy storage device is attached to said plurality of interconnect members (103) via said plurality of apertures (200).

As per one of the embodiments, said plurality of apertures (200) and said plurality of openings (203) are attached with BMS power tab and voltage tab by connecting means such as screw. In one embodiment, said plurality of interconnect member (103) is used at 5+ and 5– volts inside a battery module. As per one of the embodiments, said plurality of interconnect member (103) is made of nickel, steel, copper, clad or metal alloy etc. In one embodiment, the combination of material used for manufacturing said first independent metallic layer member (405a) and said second independent metallic layer member (405b) is same. As per one of the embodiments, the combination of material used for manufacturing said first independent metallic layer (405a) and said second independent metallic layer (405b) is different. In one embodiment, the thickness of said first independent metallic layer member (405a) is relatively lower than said second independent metallic layer member (405b). As per one of the embodiments, the thickness of said first independent metallic layer member (405a) and said second independent metallic layer member (405b) is different.

Figure 5A:
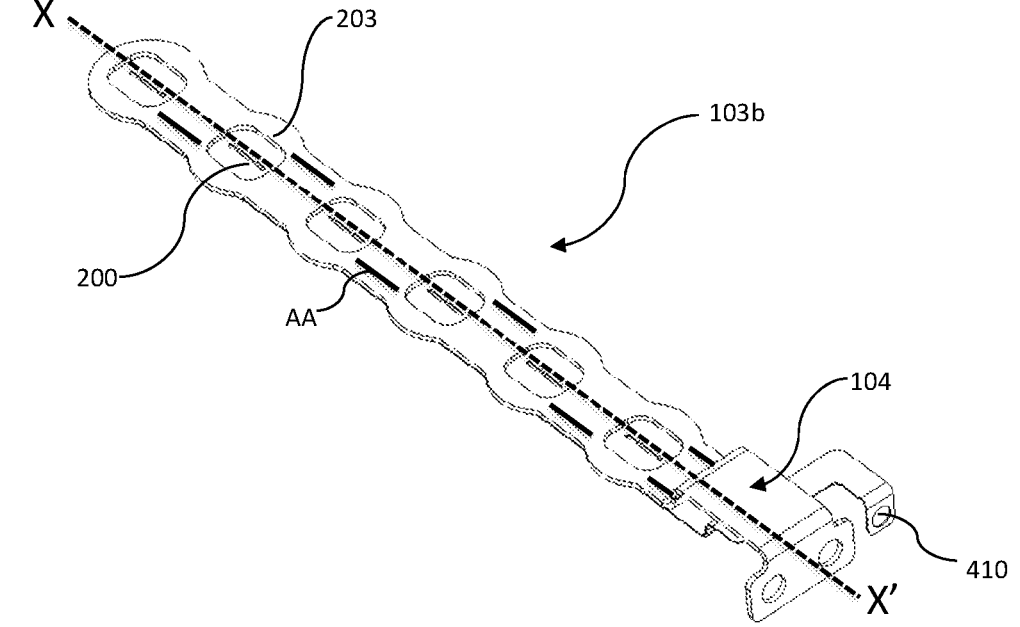
FIG. 5a illustrates a perspective view of at least one single row interconnecting structure for said at least one energy storage device of FIG. 1, as per one embodiment of the present invention.
Figure 5B:
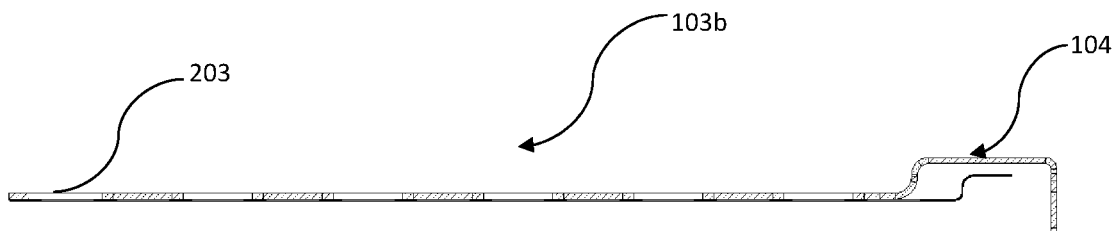
FIG. 5b illustrates a cross-section view of at least one single row interconnecting structure for said at least one energy storage device of FIG. 1, as per one embodiment of the present invention.
Figure 5C:
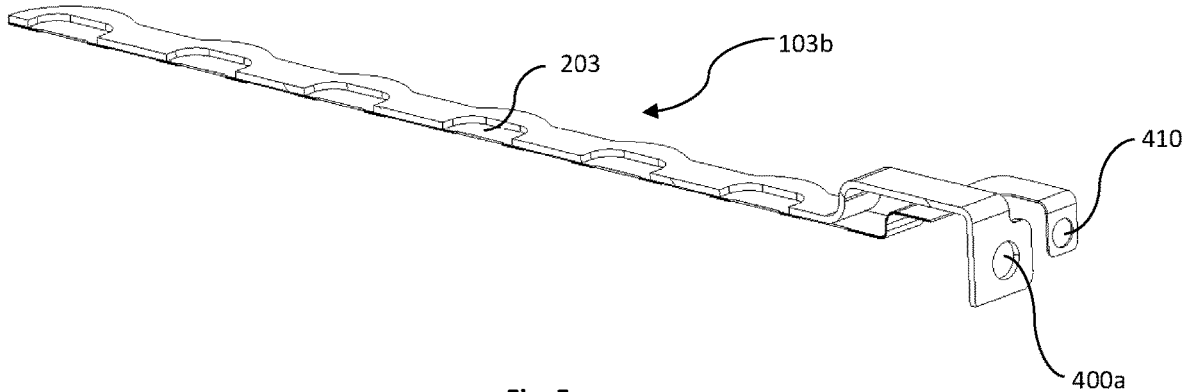
FIG. 5c illustrates a perspective view of at least one single row interconnecting structure for said at least one energy storage device of FIG. 1, as per one embodiment of the present invention.

FIGS. 5a, 5b and 5c illustrates said single row interconnecting structure (103b) including said plurality of apertures (200) formed in at least a portion therein, as per one embodiment of the present invention. In one embodiment, at least one aperture of said plurality of apertures (200) formed in at least a portion of each of said plurality of interconnect members (103). As per one embodiment, said one or more contact points (AA) includes at least one spot weld position formed in alignment by electrically connecting said each of at least one electrode structure of said plurality of apertures (200) and said at least one terminal of said one or more energy storage cells by said spot welding. FIG. 5b is a side cross-sectional view of said single row interconnecting structure (103b) along the line XX' as shown in FIG. 5a. FIG. 5c is a perspective view of said single row interconnecting structure (103b).

Figure 6A:
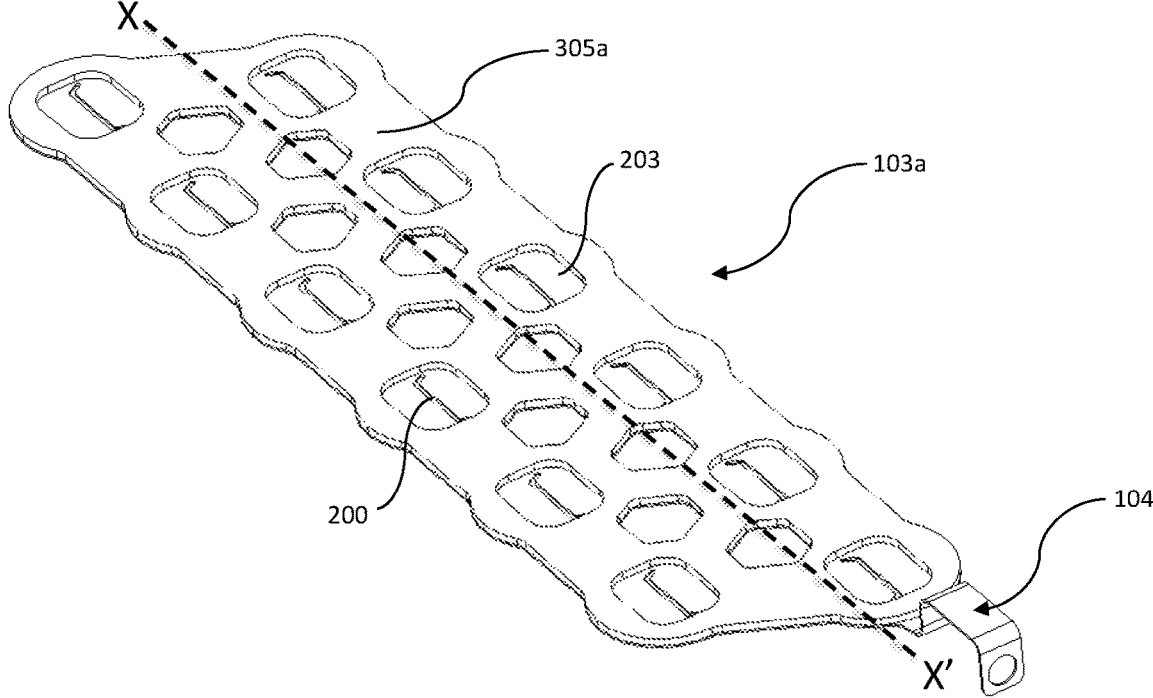
FIG. 6a illustrates a perspective view of at least one double row interconnecting structure for said at least one energy storage device of FIG. 1, as per one embodiment of the present invention.
Figure 6B:
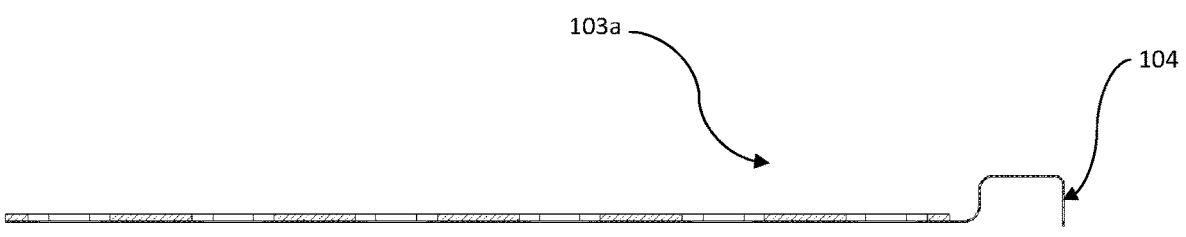
FIG. 6b illustrates a cross-section view of at least one double row interconnecting structure for said at least one energy storage device of FIG. 1, as per one embodiment of the present invention.
Figure 6C:
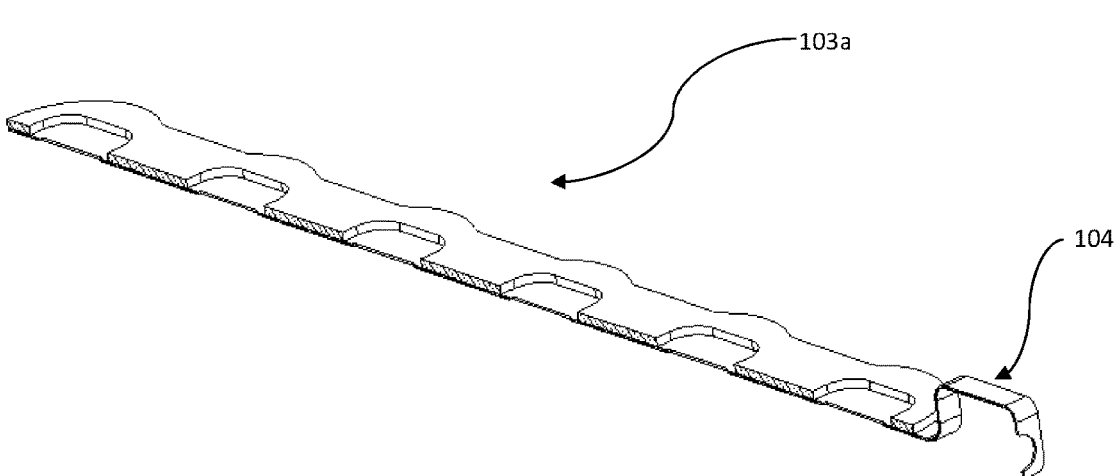
FIG. 6c illustrates a perspective view of at least one double row interconnecting structure for said at least one energy storage device of FIG. 1, as per one embodiment of the present invention.

FIGS. 6a, 6b and 6c illustrates said double row interconnecting structure (103a) including said plurality of apertures (200) formed in at least a portion therein, as per one embodiment of the present invention. In one embodiment, at least one aperture of said plurality of apertures (200) formed in at least a portion of each of said plurality of interconnect members (103). FIG. 6b is a side cross-sectional view of said double row interconnecting structure (103a) along the line XX' as shown in FIG. 6a. FIG. 6c is a cross sectional perspective view of said double row interconnecting structure (103a).

Improvements and modifications may be incorporated herein without deviating from the scope of the invention.

LIST OF REFERENCE SIGNS

100 Energy Storage Device
101 Cell Holder Assembly
100a Securing Cell Holder
100b Receiving Cell Holder
103 Interconnect Members
103a Double row interconnecting structure
103b Single row terminal interconnecting structure
104 End Portion
104a First independent arm
104b Second independent arm
105 Mounting Provisions
200 Plurality of Apertures
203 Openings
305a First independent metallic layer member (103a)
305b Second independent metallic layer member (103a)
400a, 400b Plurality of Openings on 104a
405a First independent metallic layer member (103b)
405b Second independent metallic layer member (103b)
410 Opening on 104b
AA Welding points

We claim:

1. An energy storage device comprising:
a cell holder assembly;
energy storage cells disposed in the cell holder assembly; and
interconnect members that connect with the energy storage cells, wherein
the interconnect members include:
    double row interconnecting structures disposed on opposite sides of the cell holder assembly; and
    a pair of single row terminal interconnecting structures that border the double row interconnecting structures on both sides,
    wherein each single row terminal interconnecting structure terminates with a first independent arm and a second independent arm,
    wherein two openings are formed in the first independent arm configured for withdrawing current, and
    wherein one opening is formed in the second independent arm configured for measuring voltage, each of the interconnect members includes a first independent metallic layer member and a second independent metallic layer member that are electrically coupled to each other and that electrically connect to the energy storage cells,
the first independent metallic layer member is an upper member of each interconnect member that connects the interconnect member with a battery management system (BMS),
the second independent metallic layer member is a lower member of each interconnect member that connects the interconnect member with the energy storage cells,
the first independent metallic layer member is made of copper and provides a current flow passage, and
the second independent metallic layer member is made of Nickel and establishes a joint to terminals of the energy storage cells.

2. The energy storage device as claimed in claim 1, wherein
a thickness of the first independent metallic layer member and a thickness of the second independent metallic layer member are different.

3. The energy storage device as claimed in claim 2, wherein
the thickness of the first independent metallic layer member is less than the thickness of the second independent metallic layer member.

4. The energy storage device as claimed in claim 1, wherein
the interconnect members comprise a plurality of openings.

5. The energy storage device as claimed in claim 1, wherein
slit apertures are formed in at least a portion of the interconnect members.

6. The energy storage device as claimed in claim 1, wherein
the first independent arm extends from an upper surface of each of the single row terminal interconnect member and is made of copper.

7. The energy storage device as claimed in claim 1, wherein
the second independent arm extends from a lower surface of each of the single row terminal interconnect member and is made of nickel.

* * * * *